United States Patent Office 3,388,072
Patented June 11, 1968

3,388,072
METHOD OF PREVENTING AND INHIBITING FOAM
Elemer Domba, Olympia Fields, Ill., assignor to Nalco Chemical Company, Chicago, Ill., a corporation of Delaware
No Drawing. Filed Dec. 23, 1964, Ser. No. 420,794
6 Claims. (Cl. 252—321)

ABSTRACT OF THE DISCLOSURE

This invention relates to a process of defoaming and inhibiting foam formation in such aqueous systems as latex systems and paper pulp systems by treating them with a defoaming amount of an ethylene copolymer.

This invention is concerned with a method of inhibiting and preventing foaming problems. More particularly, the instant invention relates to use of specific polymer compositions which are particularly valuable in inhibiting and preventing foaming of aqueous industrial processes.

It is known that many industrial systems are particularly susceptible to foaming problems even under mild conditions of agitation. In their more serious aspects these problems become a substantial drawback in not allowing full utilization of the particular equipment involved. Also, in many instances operating conditions are so altered by foam that considerable interference with the process itself is caused, with resultant low capacity and considerable economic loss. Serious foaming sometimes occurs, for example, when solvents or unreacted starting materials are stripped off either in vacuo or under atmospheric conditions, leaving behind the desired industrial product. For example, foaming of a considerable magnitude occurs when organic solvents used in preparing aqueous latex emulsions and/or unreacted monomer are removed by heat distillation, vacuum flashing, steam stripping or through other concentration techniques. Similarly, uncontrolled foaming at various steps in papermaking process can cause considerable difficulties.

In order to counteract foaming problems of the type discussed above and others, it is oftentimes necessary to resort to chemical treatment to both abate the existing foam and prevent its reoccurrence.

However, many of the chemical treatments are limited in their application insofar as only one of the aforementioned effects takes place. That is, either immediate foam abatement occurs but without continuing foam prevention, or a treatment will provide continuous foam protection but is of no great use in dissipating already formed foam. Therefore, in many instances it is necessary to resort to at least two or more specific chemicals acting as adminicles to one another in order to achieve both foam abatement and foam inhibition in a system under treatment. However, this resort to multi-component treatment in order to achieve the required scope of activity often leads to further problems such as dispersibility of the compounds both in each other and in the particular system to be controlled. In addition, costly time and manpower must be spent in compounding these multi-component antifoam treating compositions.

Another serious disadvantage of prior art compositions is their inability to be applied generally in a wide variety of industrial aqueous systems and processes. For example, some products while possessing good foam depressants or antifoam activity in paper mill systems are relatively less active in other environments such as in aqueous latex emulsions.

Many other disadvantages are involved in the use of prior art antifoam treatments. Some of the substances break down chemically and physically. These products of degradation may debilitate the parent active component or cause foaming problems due to their own foam encouraging properties.

It would be, therefore, a beneficial advance in the antifoaming art if a single substance could be found which is relatively general in its application to aqueous systems, has good chemical and physical stability, excellent dispersibility or solubility in the aqueous environment to be treated, and yet need only be applied in relatively low amounts to give effective control. It would be an extreme advantage to the art if an antifoam substance could be discovered which may be usefully employed, particularly in troublesome aqueous systems which have a strong tendency to foam, such as aqueous latex emulsions and in various systems used in processing paper pulp and the like.

It therefore becomes an object of the invention to provide stable, easily dispersible antifoam compounds which have rather general application in water systems without recourse to other antifoam aids.

A specific object of the invention is to provide polymer compounds which may be used in aqueous systems particularly susceptible to foaming problems such as aqueous latex emulsions, paper pulp streams, etc. Other objects will appear hereinafter.

In accordance with the invention, a class of polymer compounds has been discovered which is admirably suited for use in defoaming and foam inhibition activities. These compounds may be used as antifoam agents without resort to combination with other ingredients and may be used in a wide variety of aqueous industrial processes which are accompanied by foaming problems. In general, these antifoamers are products derived from a copolymerization reaction of ethylene and vinyl acetate, which product is then hydrolyzed to give a polyethylenepolyvinyl alcohol copolymer. Certain derivatives of this copolymer, described hereinafter, have also been discovered to be useful antifoams. These reaction products find use both as defoaming agents, that is, in abating an aqueous system already in a foaming state or in inhibiting or preventing foam formation before such a condition occurs. Both roles may, of course, be performed simultaneously.

More specifically, the antifoam agents of the invention fall within a class of copolymeric compositions made up of reoccurring moieties according to the following structural formula:

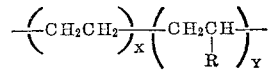

where R is a radical selected from the group consisting of hydroxyl, fatty acid ester containing at least four carbon atoms, fluoro aliphatic ester containing a $C_2$–$C_{22}$ aliphatic chain having substituted thereon at least one fluoro group, lower trialkylsiloxy ester, sulfonate, phosphate, and lower alkyl sulfonate ester, X and Y are integers whose total is such that the molecular weight of said copolymer ranges from about 1,500 to about 25,000 with the ratio of X to Y ranging from about 14:1 to about 4:1. The above recited moieties reoccur in the copolymer in a random type of distribution.

The preferred antifoam reagent of the invention is a polyethylene-polyvinyl alcohol copolymer where R in the above formula is OH. Such material is particularly favored due to ease of synthesis, low cost and excellent antifoam activity. The most preferred copolymers of this class have a molecular weight ranging from about 2,000 to about 5,000 with the proportion of X to Y varying from about 14:1 to about 8:1. As mentioned above, such material is generally made by copolymerizing ethylene and vinyl acetate and subsequently hydrolyzing the ester group to a hydroxyl group coming off the backbone of the polymeric chain by means of suitable strong acids, or bases. Preferred hydrolysis reagents are alkali metal hydroxides such as potassium hydroxide.

Other antifoam compounds falling within the above structural formula may be made by copolymerizing ethylene with the appropriate monomer such as vinyl fatty acid ester, vinyl fluoro aliphatic ester, vinyl sulfonate, etc. However, the most preferred method of their preparation is to first copolymerize ethylene with vinyl acetate, hydrolyze the resultant copolymer to a polyethylene-polyvinyl alcohol derivative, as discussed above, and finally react the —OH group of the polymer with suitable reagents to introduce the various radicals into the polymeric system.

For example, the polyvinyl alcohol-polyethylene copolymer may be reacted with fatty acids containing at least four carbon atoms or anhydrides or acyl chlorides thereof to produce the fatty acid ester. Likewise, to synthesize the fluoro aliphatic esters falling within the scope of the invention, the appropriate fluoro acids or just discussed derivatives of these acids may again be reacted with the alcohol copolymer. Also, lower trialkyl halo silanes may be reacted with the alcohol copolymer to produce the desired lower trialkyl siloxy ester. Preferred siloxy radicals contain ethyl, methyl or mixed methyl-ethyl groups. Such reactants as trimethyl chloro silane or the corresponding triethyl homologue are useful here. The copolymeric sulfonates may be prepared by reacting the appropriate polyethylene-polyvinyl alcohol copolymer with chlorosulfonic acid or similar reagents. In like manner, the phosphate derivatives may be synthesized by reaction of the alcohol copolymer with phosphorus oxychloride in a suitable solvent such as pyridine. The sulfonate ester can be prepared by reaction of the alcohol copolymer and sultones. Preferred products of this type generally contain 1–5 carbon atoms in the alkyl sulfonate side-chain.

With respect to the fatty acid copolymer derivatives, preferred materials are those formed by reaction of a polyethylene-polyvinyl alcohol copolymer with a fatty acid, fatty acid chloride or anhydride which contain at least 4 carbon atoms.

Among sources of fatty acids which may be used as such or in acyl halide or anhydride form may be mentioned heptylic acid, capric acid, diricinoleic acid, triricinoleic acid, polyricinoleic acid, ricinostearolic acid, ricinolcyl lactic acid, acetylricinoleic acid, chloracetyl-ricinoleic acid, lauric acid, myristic acid, undecylenic acid, palmitic acid, lauroleic, myristoleic, palmitoleic, oleic, gadoleic, erucic, ricinoleic, linoleic, linolenic, eneosteric, licanic, arachidonic, clupanodonic, mixtures of any two or more of the abovementioned acids or other fatty acids, mixed higher fatty acids derived from animal or vegetable sources, for example, lard, coconut oil, tall oil, rapeseed oil, sesame oil, palm kernel oil, palm oil, olive oil, corn oil, cottonseed oil, sardine oil, tallow, soybean oil, peanut oil, caster oil, seal oil, whale oil, shark oil and other fish oils, teaseed oil, partially or completely hydrogenated animal and vegetable oils such as those mentioned; hydroxy and alpha-hydroxy fatty acids, such as hydroxystearic acid, dihydroxypalmitic acid, dihydroxystearic acid, dihydroxybehenic acid, alpha hydroxy capric acid, alpha hydroxy stearic acid, alpha hydroxy palmitic acid, alpha hydroxy lauric acid, alpha hydroxy myristic acid, alpha hydroxy coconut oil mixed fatty acids, alpha hydroxymargaric acid, alpha hydroxy arachidic acid, and the like; fatty acids derived from various waxes, such as beeswax, spermaceti, montan wax, Japan wax, cocerin, and carnauba wax. Such acids include carnaubic acid, cerotic acid, lacceric acid, montanic acid, psyllastearic acid, etc.

It is interesting to note that a variety of seemingly homologous copolymers falling without the scope of the invention have been determined to be completely inactive or at the minimum show an extremely low and non-acceptable degree of activity. For example, polyethylene itself as well as the copolymer of ethylene and vinyl acetate are completely useless in performing roles as an antifoamer. Other copolymers of ethylene and vinyl esters containing less than four carbons were equally inactive. Likewise, a variety of ethers were prepared from the polyethylene-polyvinyl alcohol polymer which exhibited little if any activity in inhibiting and preventing foaming of aqueous industrial processes.

The following examples illustrate typical modes of preparation of representative antifoam compositions of the invention:

EXAMPLE I

A 90-gallon stainless steel reactor, equipped with condenser, receiver and vacuum system was charged with 200 pounds of a copolymer having a molecular weight of about 4000 and synthesized by copolymerization of 10% by weight of vinyl acetate and 90% by weight of ethylene. A potassium hydroxide solution (10% aqueous solution by weight) was also added to the reactor in an amount of 50 pounds. The potassium hydroxide and copolymer were heated to 105° C. with steam. Agitation was effected at low speed until the reaction mixture reached 70–80° C. whereupon the copolymer melted. Then the agitation was increased to higher speed during the remainder of the heating step. At a reaction temperature of about 105° C., hydrolysis of the ester groups of the copolymer began to occur. The saponification of the copolymer was maintained at an approximate 105° C. temperature for four hours. At the end of the saponification period, 200 pounds of mineral seal oil was added to the thick, creamy, emulsion-like material formed above. The water was then removed from the product by heating the reactor with steam from 105° C. to 130° C. Last traces of water were removed by maintaining the reaction temperature at 130° C., while reducing the pressure from 760 mm. to 35 mm. by gradually applying a vacuum. The reactor was then restored to atmospheric conditions and the reaction mixture diluted with an additional 600 pounds of mineral seal oil while keeping the temperature above 80° C. during this dilution step. The diluted material was further mixed at 80° C. for approximately 15–30 minutes. The product, falling within the above listed structural formula where R is OH, was then cooled and drummed. Excellent antifoam activity was noted with direct use of this product without further modification of any type.

EXAMPLE II

In this example, a derivative of the copolymer of Example I above was made by reacting the alcohol group with an amount of stearic acid chloride in excess of that theoretically necessary to effect complete esterification. The ester was simply and quickly formed via this reaction.

EXAMPLE III

Again, the copolymer of Example I was further reacted, and in this instance with trifluoro acetic acid chloride. The reaction again ran smoothly and to completion in a minimum amount of time.

EXAMPLE IV

Another fatty acid ester derivative of the copolymer of Example I was formed by reaction of oleic acid chloride with the alcohol copolymer via the technique in Example II. The reaction again occurred in a minimum of time and without difficulty.

EXAMPLE V

The butyrate ester derivative of the copolymer of Example I was formed by reaction of butyric acid chloride and the alcohol copolymer. Substantially complete reaction was achieved in a relatively short time.

EXAMPLE VI

In this example chlorosulfonic acid was reacted with the copolymer of Example I to produce the resultant sulfonate derivative. The reaction went smoothly and with a minimum of effort.

EXAMPLE VII

The phosphate derivative of the polyvinyl alcohol-polyethylene copolymer of the invention was synthesized by reaction of the copolymer of Example I with phosphorus oxychloride in pyridine solvent. Under these conditions the corresponding phosphate polymer was easily achieved.

EXAMPLE VIII

A typical sulfonate ester of the invention was made by reacting the polyvinyl alcohol-polyethylene copolymer with propane sultone.

The products of the invention may be used as such without any further compounding or modification such as by dispersion in organic solvents. However, it is preferred that the reaction products before employment are first dispersed in aliphatic hydrocarbon oils such as mineral seal oil, kerosene, various light aliphatic fuel oils, gas oils, paraffin waxes and the like.

In many instances emulsifying agents, such as polyoxyethylene glycols and polyalkylene glycols, as those marketed under the trade names of "Ucon" and "Carbowax," may be added to the products of the invention or to their formulations in aliphatic hydrocarbon oil extenders. Compounds other than emulsifiers and extenders, such as dispersants and the like, may be added to the products of the invention or to their formulations in aliphatic hydrocarbon oil extenders in order to obtain formulated products of the desired physical characteristics in order to overcome feeding problems, etc.

The just-discussed products are useful in a wide variety of industrial processes which require control of foaming problems. Among these processes, the compositions may be used in the following: the feedwater of boilers such as wayside boilers; for use in non-frothing emulsions used in leather tanning, in the textile industry; for incorporation into dye baths, dye pastes, discharge pastes and the like; to prevent foaming and resultant loss of liquid from a circulating cooling system; in fermentation processes; and in single or multiple-effect concentrators containing aqueous, organic or inorganic type materials and the like.

Besides use in the above varied processes involving a wide scope of aqueous environmental conditions, the compositions of the invention are also active in controlling foaming of latex emulsions used for paints or coatings and in inhibiting and controlling foam in pulp and paper manufacture such as in a kraft process. The compositions have found particular use in inhibiting foam normally occurring during preparation and concentration of natural or synthetic rubber latexes via rubber latex emulsion polymerization of such monomers as styrene, acrylonitrile, butadiene, isobutylene, isoprene, chloroprene and mixtures of any of the above. Soaps and surfactants used in the polymerization step cause severe foaming difficulties in absence of use of the defoaming and antifoam additives of the invention. Paper coating such as butyl latex or polyvinyl chloride latex may likewise be treated during their production, with the instant antifoamers.

When used to control and inhibit foam in aqueous industrial areas, addition of as little as 1 p.p.m. of the compositions of the invention gives good foam inhibition and foam prevention. As much as 500 p.p.m. of antifoam may be used, with a preferred range between 1 and 100 p.p.m., and with the most preferred range being 1–25 p.p.m.

The compounds of the invention are effective over a wide range of pH conditions and under almost any combination of pressure and temperature conditions. The compositions when used as antifoam agents should preferably be added as close as possible to the source of the foam. For example, to inhibit foam created under conditions of distilling off unreacted monomer and/or solvents used during production of aqueous latex emulsions, as the type used in the paint and coating industries, the antifoam composition should be added directly to the reaction mass being processed, whereby it is actually present during the concentration step. Likewise, in a papermaking operation, since foaming difficulties occur in the screen boxes and the cylinders of a cylindrical papermaking machine or in the headbox of a Fourdrinier papermaking machine, it is preferred that the antifoam application be made there. The antifoam compounds of the invention may also be added to the feed box or to the screen pump, screens, or showers of the cylinder machine, or to the fan pump, showers or wire pit of the Fourdrinier machine. When used for antifoam control in pulp and paper manufacture, as little as 0.1 pound of active antifoam per ton of pulp based on the weight of the dry fiber gives good results. As high as 20 pounds/ton may be used in extremely difficult foaming areas. In a preferred practice, between ¼ and 2 pounds of chemical are used per ton of fiber stock.

EVALUATION OF THE INVENTION

In order to determine the effectiveness of the antifoam compositions of the invention, and particularly their versatility in inhibiting and controlling foam under a wide variety of environmental conditions, various laboratory procedures were devised to simulate industrial conditions and test the efficiency of the reaction products of the invention.

The first test, known as a "Recirculation Test," was devised in order to determine the antifoam activity of the compositions of the invention with respect to paper pulp stock. A test stock was first prepared as follows: to 860 ml. of water containing 224 mg. calcium chloride, were added 140 grams of 16% total solids black liquor and 50 ml. of a 1% aqueous solution of a sodium salt of a rosin acid. 58 ml. of this solution were then added to a 1 gallon jug. 18 grams of kraft pulp were pulped in 1,000 ml. of water and added to the jug containing the black liquor mixture. Stock was then made up to 1 gallon with tap water, well shaken and employed for the following test. In this test, 6 liters of the above paper stock containing pulp were placed in a glass pipe, 6" in diameter and 18" in height. The stock was recirculated through a 1½ diameter hose by means of a pump which was running at 3,450 r.p.m. The amount of antifoam necessary to prevent foam build-up during recirculation was then determined.

The composition of Example I was then tested for antifoam activity in the above discussed recirculation test. This product had excellent activity in preventing and inhibiting foam build-up and in deaerating the paper stock within the aforementioned limits of chemical application per ton of paper stock. For example, after 30 seconds time, the foam height was 2.0 cm. with a 55 p.p.m. addition of chemical and after 60 seconds the height was only 2.2 cm. A blank run without benefit of chemical flowed over the tube in form of foam after about 10 seconds of agitation.

Another test was performed in order to determine antifoam activity of the compositions of the invention with respect to latex paints. To a half-pint paint can was added 100 ml. of aqueous latex emulsion and 10 p.p.m. of the antifoam of Example I. The can was sealed and mounted in a shaker for 3 minutes. The contents were then poured into a weight per gallon cup and weighed to determine the weight loss due to aeration. A blank was also run, that is, the above test run in absence of antifoam. The sample in which the antifoam was present showed little loss of weight due to aeration, while the unprotected or blank sample showed weight losses as high as 100% due to foam formation. The above demonstrates the excellent activity of the antifoam compositions of the invention in preventing foaming problems of aqueous latex emulsions systems.

The antifoamers of the invention were also tested on acrylic emulsions and butyl rubber latex emulsions. These emulsions were used as test media in the above discussed recirculation test in replacement of paper pulp test stock. Excellent foam inhibition was noted in employment of antifoam in amounts from 1 p.p.m. to 100 p.p.m. based on the weight of the latex. In fact, the reaction products of the invention exhibited a considerably higher degree of antifoam activity than did commercially available silicones which were also similarly tested.

Another test was devised to determine antifoam properties of the compositions of the invention in agitated proteins. A protein test solution was prepared as follows: a de-oiled flaked soya protein (200 g.) was treated for one hour with 3.8 g. of sodium hydroxide in 3.8 liters of Chicago tap water at 104° F. The solution was filtered through an 80 mesh screen and the filtrate used for the following experiment. This was performed by placing 50 ml. of the freshly prepared protein stock in an "Osterizer" jar. The stock was beaten for 5 seconds until a thick, high foam was generated.

The antifoam was then added and blended in the stock for 20 seconds. The time for the surface to clear was then measured. Using varying amounts of the reaction product of Example I, the surface of the stock was cleared in from approximately ½ to 20 seconds. No stock precipitation was noted and the stock itself remained clear.

The copolymer derivatives of Examples II–VII were also tested in the "Recirculation Test" described above. Excellent antifoam activities were exhibited in each case when these derivatives were employed in amounts ranging from about 10 to 100 p.p.m.

The invention, of course, is not limited by the above examples of antifoam use which are meant to be merely illustrative of the type of aqueous media which may be foam controlled by the claimed compositions.

The invention is hereby claimed as follows:

1. A process of defoaming and inhibiting oam formation in an aqueous system selected from the group consisting of latex emulsions, paper pulp systems and paper coating systems which comprises the step of adding to said system in an amount sufficient to control said foam a copolymer made up of reoccurring moieties according the following structural formula:

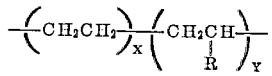

where R is a radical selected from the group consisting of hydroxyl, fatty acid ester containing at least four carbon atoms, fluoro aliphatic ester containing a $C_2$–$C_{22}$ aliphatic hydrocarbon group having as its only substitution at least one fluoro group, lower trialkyl siloxy ester, sulfonate, phoshpate, and lower alkyl sulfonate ester, and X and Y are integers whose total is such that the molecular weight of such copolymer ranges from about 1,500 to about 25,000 with the proportion of X to Y ranging from about 14:1 to 4:1.

2. The process of claim 1 wherein said copolymer is added to said system in an amount of at least 1 p.p.m.

3. The process of claim 1 wherein said aqueous system is a latex emulsion.

4. The process of claim 1 where said aqueous system is a paper pulp system.

5. A process of defoaming and inhibiting foam formation in an aqueous system selected from the group consisting of latex emulsions, paper pulp systems and paper coating systems which comprises the step of adding to said system in an amount sufficient to control said foam a copolymer made up of reoccurring moieties according to the following structural formula:

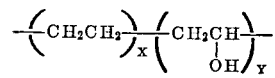

where X and Y are integers whose total is such that the molecular weight of said copolymer ranges from about 2,000 to about 5,000 with the proportion of X to Y ranging from about 14:1 to about 8:1.

6. The process of claim 5 wherein said copolymer is added in an amount of at least 1 p.p.m.

References Cited
UNITED STATES PATENTS

| | | | |
|---|---|---|---|
| 2,386,347 | 10/1945 | Roland | 260—87.3 |
| 2,399,653 | 5/1946 | Roland | 260—87.3 |
| 2,421,971 | 6/1947 | Sperati | 260—91.3 X |
| 2,703,794 | 3/1955 | Roedel | 260—87.3 |
| 3,127,352 | 3/1964 | Stark et al. | 252—321 |

LEON D. ROSDOL, *Primary Examiner.*

HERBERT B. GUYNN, *Examiner.*